(12) United States Patent
Matsumaru

(10) Patent No.: US 11,906,321 B2
(45) Date of Patent: Feb. 20, 2024

(54) MAP DISPLAY DEVICE AND MAP DISPLAY METHOD

(71) Applicant: MITSUBISHI ELECTRIC CORPORATION, Tokyo (JP)

(72) Inventor: Satoshi Matsumaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 503 days.

(21) Appl. No.: 17/260,017

(22) PCT Filed: Oct. 1, 2018

(86) PCT No.: PCT/JP2018/036633
§ 371 (c)(1),
(2) Date: Jan. 13, 2021

(87) PCT Pub. No.: WO2020/070766
PCT Pub. Date: Apr. 9, 2020

(65) Prior Publication Data
US 2021/0310822 A1 Oct. 7, 2021

(51) Int. Cl.
*G01C 21/36* (2006.01)
*G08G 1/0969* (2006.01)
(Continued)

(52) U.S. Cl.
CPC .......... *G01C 21/3694* (2013.01); *B60K 35/00* (2013.01); *G01C 21/3461* (2013.01);
(Continued)

(58) Field of Classification Search
CPC ............ G01C 21/3694; G01C 21/3461; G01C 21/3658; B60K 35/00; B60K 2370/166;
(Continued)

(56) References Cited

U.S. PATENT DOCUMENTS

2014/0107911 A1* 4/2014 Park ..................... G06V 20/582
701/119

FOREIGN PATENT DOCUMENTS

CN  104851311 A  *  8/2015
CN  110081899 A  *  8/2019
(Continued)

OTHER PUBLICATIONS

Office Action dated Jul. 12, 2022 issued in corresponding Japanese Application No. 2020-550961 with an English Translation.
(Continued)

*Primary Examiner* — Robert T Nguyen
(74) *Attorney, Agent, or Firm* — Birch, Stewart, Kolasch & Birch, LLP

(57) ABSTRACT

An object of the present invention is to display a list of traffic information of a plurality of lanes. A map display device of the present invention includes a traffic information acquisition unit that acquires traffic information for a road including a plurality of lanes for each lane, and a display control unit that creates a road map image that represents a road for each lane using map data having lane link data, and causes a display device mounted on a vehicle to display thereof, in which the display control unit superimposes the traffic information on the corresponding lane in the road map image.

3 Claims, 20 Drawing Sheets

(51) Int. Cl.
  *B60K 35/00* (2006.01)
  *G01C 21/34* (2006.01)

(52) U.S. Cl.
  CPC ....... *G01C 21/3658* (2013.01); *G08G 1/0969* (2013.01); *B60K 2370/166* (2019.05)

(58) Field of Classification Search
  CPC ........ B60K 2370/152; B60K 2370/167; B60K 2370/1868; B60K 2370/21; B60K 2370/347; B60K 2370/595; G08G 1/0969; G08G 1/096716
  See application file for complete search history.

(56) References Cited

FOREIGN PATENT DOCUMENTS

| | | | | |
|---|---|---|---|---|
| EP | 3154043 A1 | * | 4/2017 | ......... G01C 21/3694 |
| JP | 2006-105686 A | | 4/2006 | |
| JP | 2006-277546 A | | 10/2006 | |
| JP | 2007-71579 A | | 3/2007 | |
| JP | 2009-150802 A | | 7/2009 | |
| JP | 2009-168779 A | | 7/2009 | |
| JP | 2010-181156 A | | 8/2010 | |
| JP | 2015-75479 A | | 4/2015 | |
| JP | 2017015846 A | * | 1/2017 | |
| JP | 2017-146131 A | | 8/2017 | |
| JP | 2018132529 A | * | 8/2018 | |
| JP | 6585009 B2 | * | 10/2019 | ............. B60Q 1/346 |

OTHER PUBLICATIONS

Japanese Office Action dated Jan. 5, 2022 in corresponding Japanese Application No. 2020-550961 with an English Translation.
International Search Report, issued in PCT/JP2018/036633, dated Jan. 8, 2019.

* cited by examiner

F I G. 6
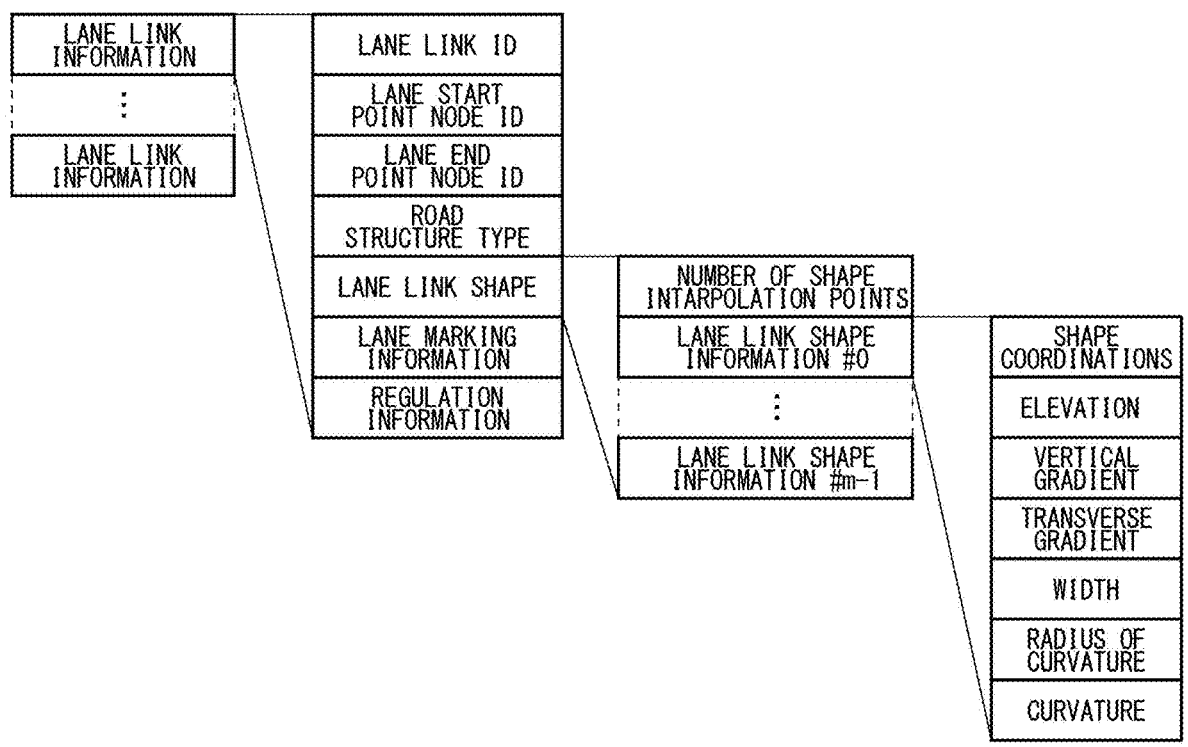

F I G. 8
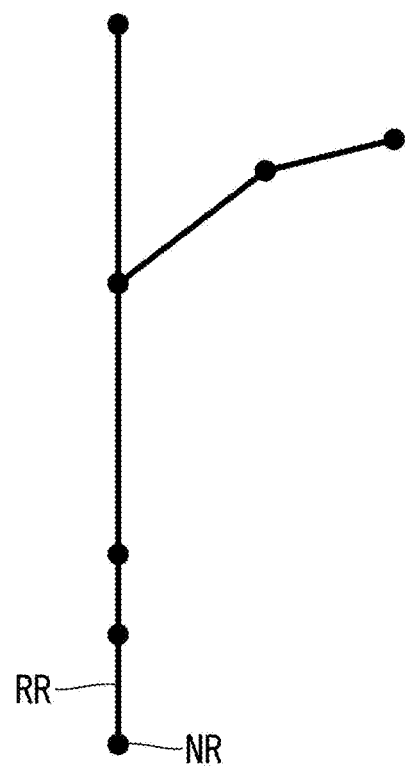

F I G. 1 3
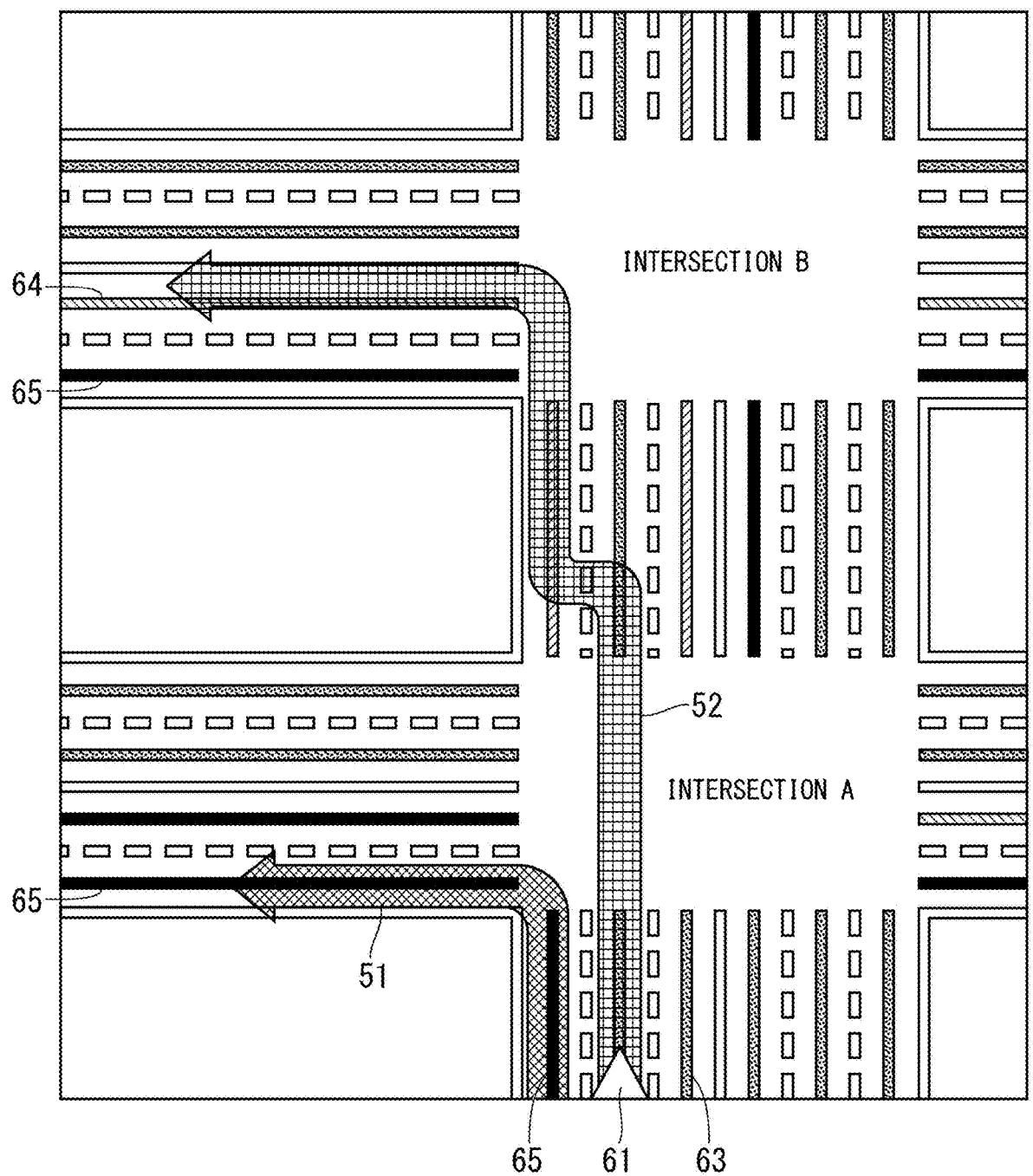

F I G. 1 7
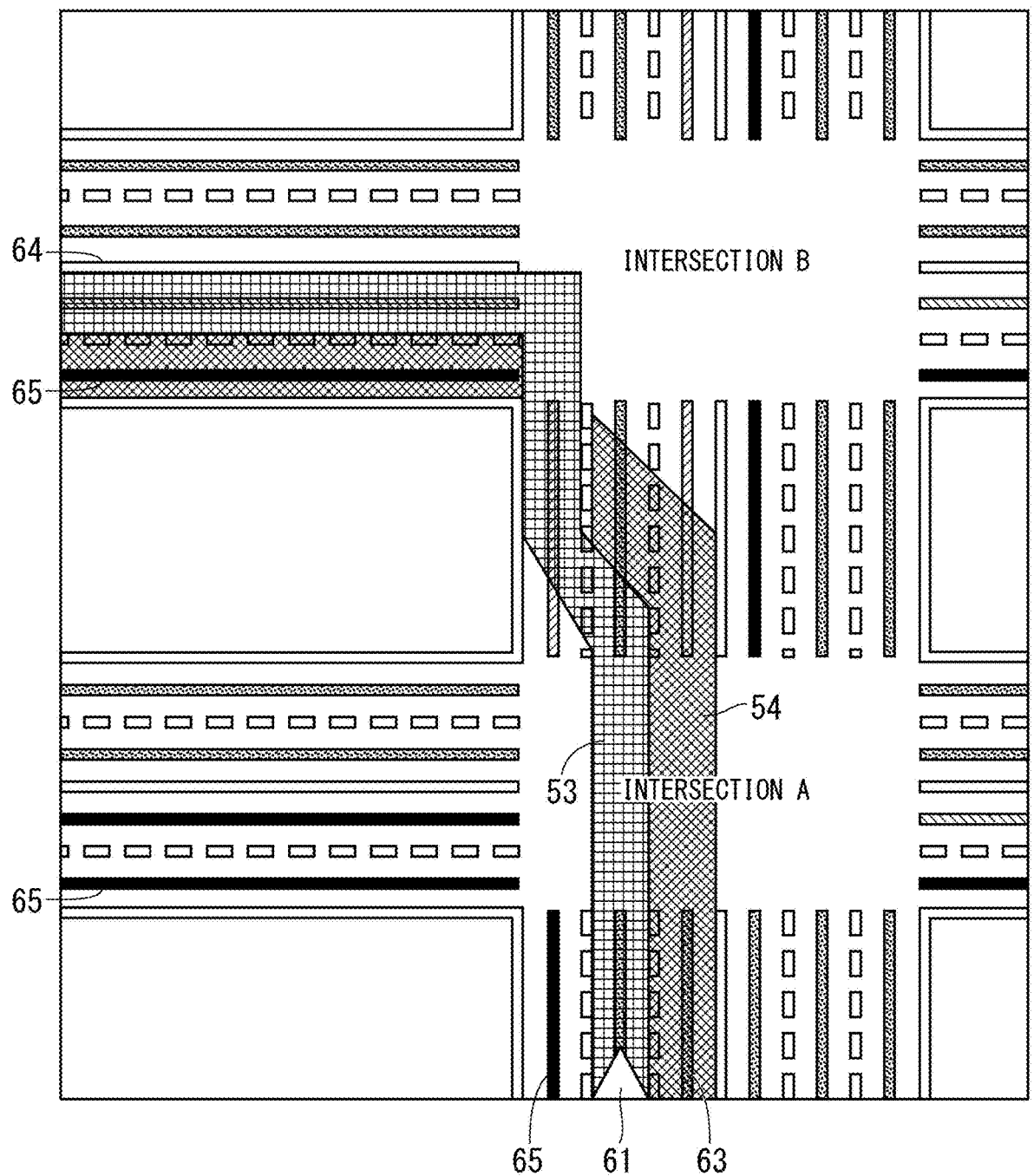

MAP DISPLAY DEVICE AND MAP DISPLAY METHOD

TECHNICAL FIELD

The present invention relates to a technique for displaying a road map for each lane.

BACKGROUND ART

Patent Document 1 discloses a navigation device that displays traffic congestion information on a road on a road map screen.

PRIOR ART DOCUMENTS

Patent Documents

[Patent Document 1] Japanese Patent Application Laid-Open No. 2010-181156

SUMMARY

Problem to be Solved by the Invention

The road map data used by the navigation device of Patent Document 1 is link data for each road, not link data for each lane. Therefore, on the road map screen, a road including a plurality of lanes is represented by one line, not for each lane. Therefore, the navigation device of Patent Document 1 displays the traffic information of a specific lane the user chose on the road map screen, and has been unable to display the traffic congestion information of each lane in a list. Further, the user needs to perform an operation of selecting the other lane from the list in order to display the traffic information of the other lane that is not displayed on the road map screen.

The present invention has been made to solve the above problems, and an object of the present invention is to display a list of traffic information of a plurality of lanes.

Means to Solve the Problem

A map display device of the present invention includes a traffic information acquisition unit that acquires traffic information for a road including a plurality of lanes for each lane, and a display control unit that creates a road map image that represents a road for each lane using map data having lane link data, and causes a display device mounted on a vehicle to display thereof, in which the display control unit superimposes the traffic information on the corresponding lane in the road map image.

A map display method of the present invention includes acquiring traffic information for a road including a plurality of lanes for each lane, creating a road map image representing the road for each lane using map data having lane link data, and causing a display device mounted on a vehicle to display the road map image, in which the traffic information is superimposed on the corresponding lane in the road map image.

Effects of the Invention

The present invention creates a road map image representing the road for each lane using map data having lane link data. Therefore, according to the present invention, displaying of traffic information on each lane in the road map image is ensured, enabling to acknowledge an overview of the traffic information of a plurality of lanes.

BRIEF DESCRIPTION OF DRAWINGS

FIG. 6 A diagram illustrating a data structure of road network data.

FIG. 8 An image diagram of a road based on road link data.

FIG. 13 A diagram illustrating an effect of the road map image by the map display device of Embodiment 2.

FIG. 17 A diagram illustrating a road map image by the map display device of Embodiment 3.

DESCRIPTION OF EMBODIMENTS

A. Embodiment 1

<A-1. Configuration>

Figure 1:
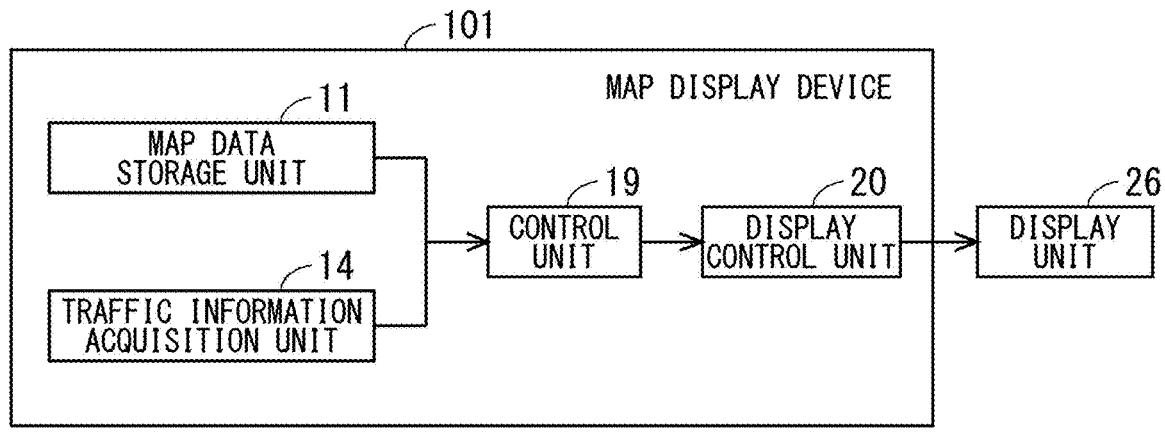
FIG. 1 A block diagram illustrating a functional configuration of a map display device according to Embodiment 1.

FIG. 1 is a block diagram illustrating a functional configuration of a map display device 101 according to Embodiment 1. The map display device 101 displays a road map image showing traffic information for each respective lane on a display unit 26. The display unit 26 is a display device such as a liquid crystal display or a Head Up Display (HUD) mounted on a vehicle. In the present specification, a vehicle equipped with a display device for displaying a road map image created by the map display device is simply referred to as a "vehicle".

The map display device 101 includes a map data storage unit 11, a traffic information acquisition unit 14, a control unit 19, and a display control unit 20. The map display device 101 is mounted on a vehicle, for example.

The map data storage unit 11 stores map data. This map data includes lane link data. The lane link data is data that represents a road by links for each lane. With use of the lane link data, the map display device 101 can create a road map representing the road for each lane, and can also perform a route search for each lane. The details of the lane link data will be described in Embodiment 2. The map data may be stored in a server or the like outside the map display device 101, and the map display device 101 may acquire the map data from the server or the like as necessary and store it in the map data storage unit 11. The map data stored in the map data storage unit 11 is output to the control unit 19 as necessary.

The traffic information acquisition unit 14 acquires traffic information for each lane. Here, the traffic information is information on traffic on a road of which conditions change with time, such as information on the degree of congestion or information on a place where an accident occurs. The traffic information may also be information indicating a factor that restrains the speed in a lane other than an accident. Fixed information that does not change over time, such a lane travel direction in a lane, a speed limit, or a shape, is not included in the traffic information. The traffic information acquired by the traffic information acquisition unit 14 is output to the control unit 19 as necessary.

The control unit 19 controls the operation of each unit in the map display device 101.

The display control unit 20 acquires the map data and the traffic information from the control unit 19, and creates a road map image based on the control of the control unit 19. In the road map image, the road is represented for each lane, and the traffic information of the lane is superimposed and displayed on the lane in the road map image. The display control unit 20 causes the display unit 26 to display the created road map image.

<A-2. Operation>

Figure 2:
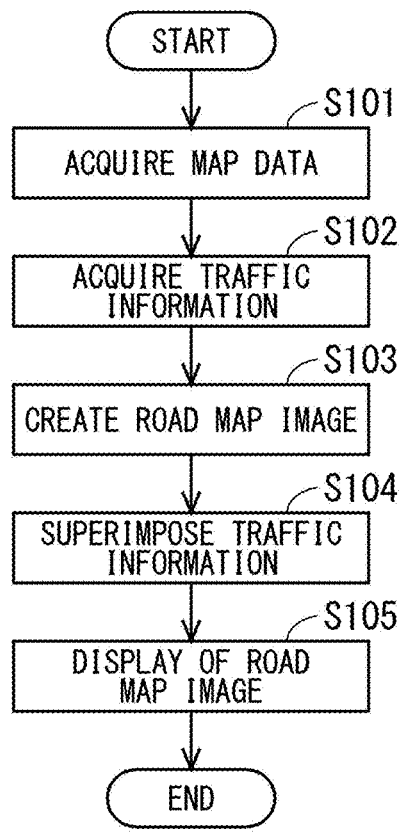
FIG. 2 A flowchart illustrating the operation of the map display device according to Embodiment 1.

FIG. 2 is a flowchart illustrating the operation of the map display device 101. The flow of FIG. 2 starts at the timing when, for example, the accessory power of the vehicle is turned on and the power of the map display device 101 is turned on. First, the control unit 19 acquires the map data from the map data storage unit 11 (Step S101). Next, the traffic information acquisition unit 14 acquires the traffic information (Step S102) and outputs it to the control unit 19. The traffic information acquired in Step 102 is the traffic information for each lane in the geographical range included in the map data acquired in Step S101. Note that Steps S101 and S102 are in no particular order. Next, the display control unit 20 acquires the traffic information and the map data from the control unit 19 and creates a road map image from them (Step S103). The road map image created in Step 103 represents the road for each lane, and the traffic information has not yet been superimposed.

Next, the display control unit 20 superimposes the traffic information on the corresponding lane on the road map image (Step S104). Then, the display control unit 20 causes the display unit 26 to display the road map image (Step S105).

The map display device 101 according to Embodiment 1 includes the traffic information acquisition unit 14 that acquires traffic information for a road including a plurality of lanes for each lane, and the display control unit 20 that creates a road map image that represents a road for each lane using map data that has lane link data, and causes the display device mounted on the vehicle to display it, in which the display control unit 20 superimposes the traffic information on the corresponding lane in the road map image. Accordingly, a passenger of the vehicle can intuitively grasp the traffic information for each lane.

Also, a map display method according to Embodiment 1 is a map display method includes acquiring the traffic information for a road including a plurality of lanes for each lane, creating the road map image that represents a road for each lane using map data that has lane link data, and causing the display device mounted on the vehicle to display the road map image, in which the traffic information is superimposed on the corresponding lane in the road map image. Accordingly, a passenger of the vehicle can intuitively grasp the traffic information for each lane.

B. Embodiment 2

<B-1. Configuration>

Figure 3:
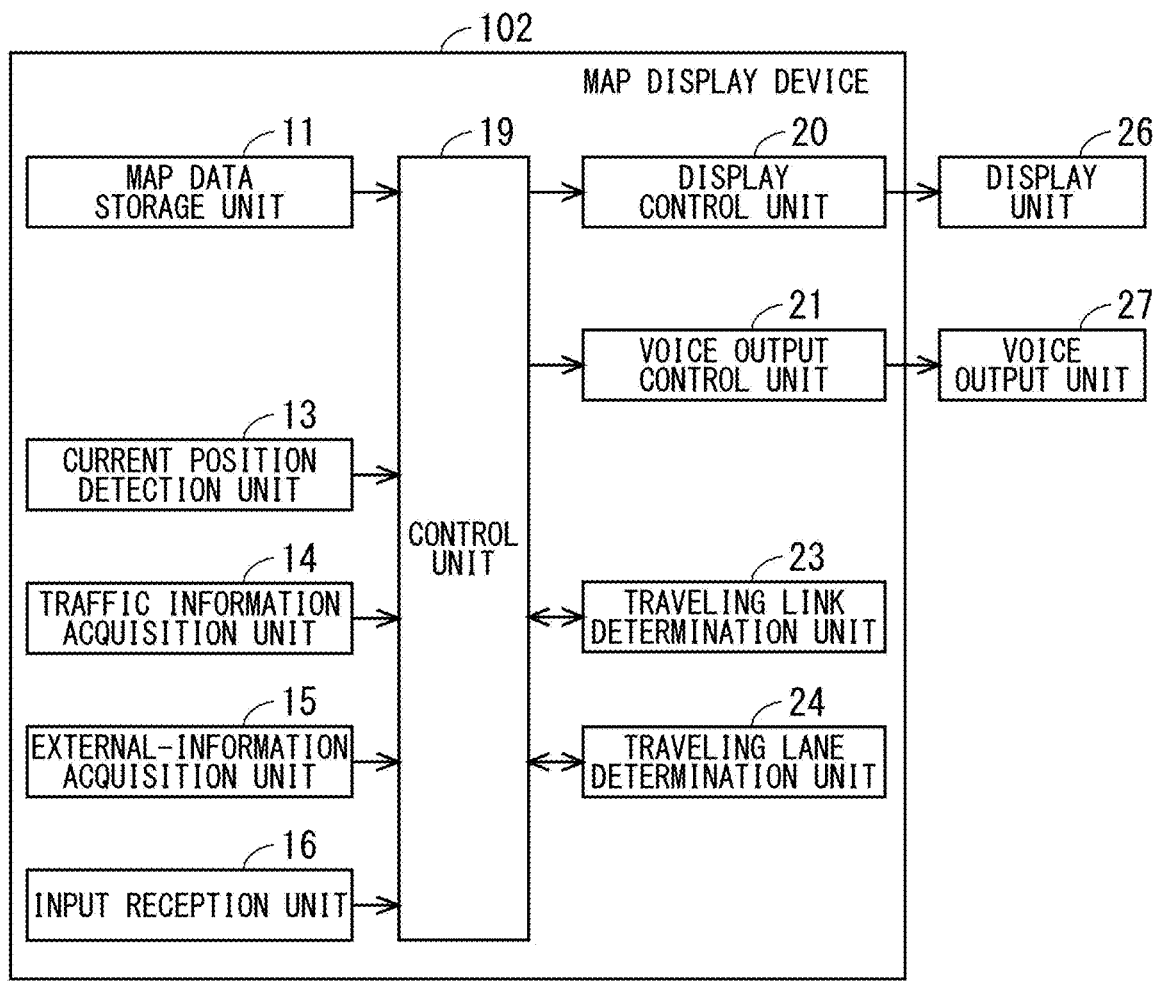
FIG. 3 A block diagram illustrating a functional configuration of a map display device according to Embodiment 2.

FIG. 3 is a block diagram illustrating a functional configuration of a map display device 102 according to Embodiment 2. The map display device 102 includes a map data storage unit 11, a current position detection unit 13, a traffic information acquisition unit 14, an external-information acquisition unit 15, an input reception unit 16, a display control unit 20, a voice output control unit 21, a traveling link determination unit 23, and a traveling lane determination unit 24. In the configuration of the map display device 102, the same reference numerals are given to the components that are the same as or correspond to those in the configuration in the map display device 101 of Embodiment 1.

The map data storage unit 11 stores map data hierarchically structured in accordance with a plurality of predetermined scales. The map data includes road link data and lane link data. Road information is information about roads. The road information includes, for example, the latitude and longitude of the road, the identifier of the road, the number of lanes of the road, information on the attributions of the road, and the shape of the road. The road attributions include, for example, general roads, highways or priority roads. The road information is information about lanes included in a road. The lane information includes, for example, identifiers of lanes included in a road, the latitude and longitude of a lane, latitudes and longitudes of each line included in a lane, and information about the curvature of each line included in a lane. The lane marking information is information about lane markings included in a lane. The road information is managed for each respective road. The lane information and the lane marking information are managed for each respective lane.

The current position detection unit 13 detects the current position of the vehicle by using the information detected by the output data of the Global Navigation Satellite System (GNSS) receiver or various sensors. The current position of the vehicle detected by the current position detection unit 13 is output to the control unit 19 as position information. Accordingly, the current position detection unit 13 functions as a position information acquisition unit that acquires the position information of the vehicle.

The traffic information acquisition unit 14 receives the traffic information from the outside of the map display device 102.

The external-information acquisition unit 15 is a unit that detects peripheral information of the vehicle as external information, and is composed of various sensors such as a front camera, a rear camera, and a laser radar. The front camera is installed in the vehicle and images the area in front of the vehicle in the traveling direction. The rear camera is installed in the vehicle and images the area in the rear of the vehicle in the traveling direction. The external information detected by the external-information acquisition unit 15 includes white line information of the traveling road and information about road signs, obstacle, and the like. The external information is used to determine a lane on which the vehicle is traveling.

The input reception unit 16 is a unit that receives an operation input of a user such as a passenger of the vehicle, which inputs a destination at the time of route search with the reception of the operation input, and provides various instructions to the control unit 19. The input reception unit 16 may have a function of receiving a voice input. In this case, the input reception unit 16 recognizes the input voice by collating the input voice with a voice recognition dictionary, and provides an instruction corresponding to the recognized voice to the control unit 19.

The voice output control unit 21 controls the voice output in a voice output unit 27 in accordance with the instructions by the control unit 19. The voice output unit 27 outputs voice such as route guidance information in accordance with the control of the voice output control unit 21.

The traveling link determination unit 23 collates the current position of the vehicle detected by the current position detecting unit 13 with road network data of the map data acquired from the map data storage unit 11, and specifies a road link on which the vehicle is traveling as a traveling link.

The traveling lane determination unit 24 determines the traveling lane of the vehicle on the traveling link specified by the traveling link determination unit 23 based on the lane link information on the traveling link included in the map data and the external information acquired by the external-information acquisition unit 15.

<B-2. Map Data>

Figure 4:
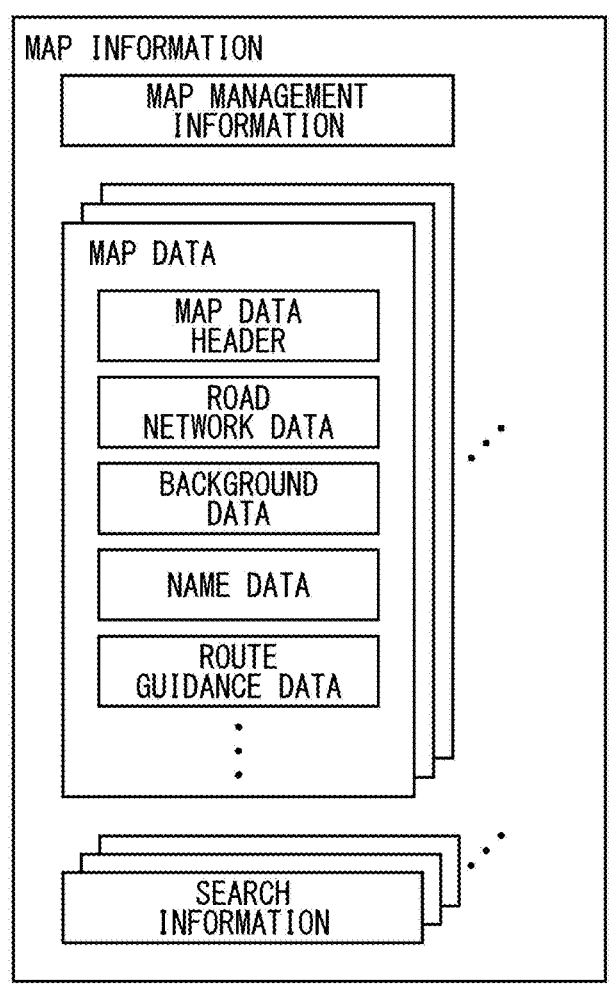
FIG. 4 A diagram illustrating a data structure of map information.

FIG. 4 illustrates an example of the data structure of the map information stored in the map data storage unit 11. The map information includes map management information, the map data and search information. The map management information includes, for example, version information indicating a version of the map information, hierarchy management information for managing each map data for each hierarchy, and search management information for managing the search information. The search information is provided for each type of information to be searched. The search information includes information for searching various information such as cities, roads, facilities, addresses, telephone numbers or intersections.

The map data is hierarchically structured for each of a plurality of predetermined scales, and is set corresponding to the mesh of each hierarchy. Map data includes map data headers, the road network data, background data, name data and route guidance data.

The map data header includes information for managing each data in the map data. The road network data is information representing a road network, and includes node information representing intersections, branches or points on a road, road link data representing roads connecting nodes, and lane link data representing lanes of each road. The background data includes surface data representing rivers or the sea, line data representing linear rivers or railroads, and point data representing facility symbols or the like. The name data includes road name information representing road names, place name information representing place names, and background name information representing background names such as rivers, seas, and facility symbols. The route guidance data includes information required for route guidance at intersections and the like.

<B-3. Road Network Data>

Figure 5:
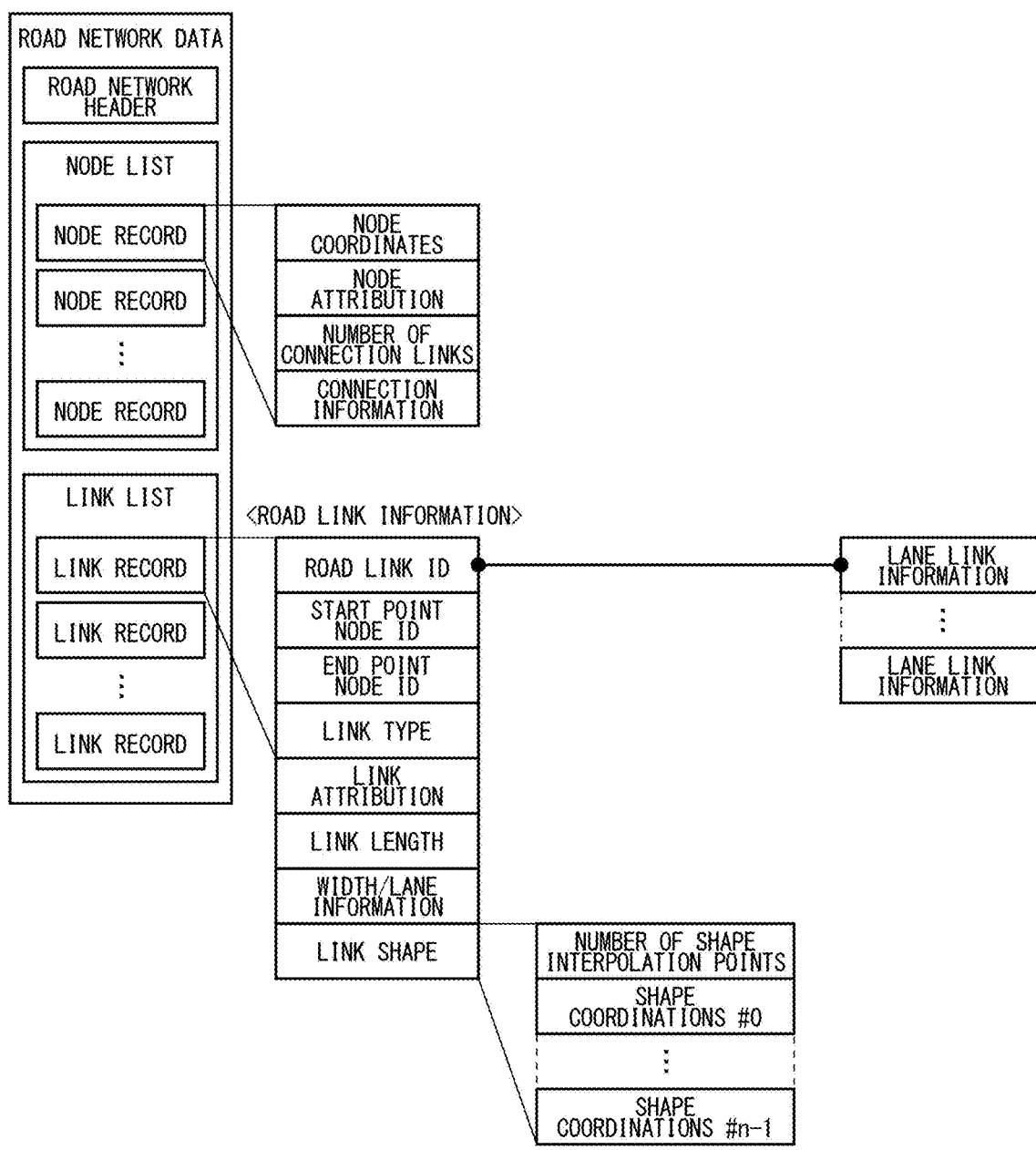
FIG. 5 A diagram illustrating a data structure of road network data.

FIG. 5 illustrates the structure of the road network data, and FIG. 6 illustrates the structure of the lane link information included in the road network data. The road network data includes a road network header, a node list and a link list. The road network header includes information necessary for managing the road network data. The information required for managing the road network data includes the number of nodes and links existing in the mesh, the number of ID management records, the storage position and data size of each list, and the storage position and data size of each table and the like.

The node list is data about the nodes existing in the corresponding mesh. The node list is composed of node records provided corresponding to the nodes. The order of the node records in the node list is the node ID. The node ID has a one-to-one correspondence with the node in the mesh and is used to identify the node in the mesh.

Each node record contains node coordinates, a node attribution, number of connection links and connection information. Node coordinates indicate a geographical position of a node in latitude and longitude. The node attribution indicates whether the node is an intersection or a boundary node. The number of connected links represents the number of links connected to the node. The connection information indicates the link ID of the link connecting to the node in the mesh.

The link list is data about the links existing in the corresponding mesh. The link list is composed of link records provided corresponding to the links. Each link record has road link information and lane link information associated with the road link information. The road link information includes a road link ID, a start point node ID, an end point node ID, a link type, a link attribution, a link length, width/lane information, and a link shape. The road link ID is used to identify the link in the mesh. The start point node ID represents the node ID of the start point node which is the node on the start point side of the link. The end point node ID represents the node ID of the end point node which is the node on the end point side of the link. The link type is a type indicating the connection of links, and includes, for example, "main line", "inside an intersection", and "ramp". The link attribution includes, for example, the road type of the link, the average travel time, the traffic regulation, the speed limits, and the like. The link length represents the length of the link. The lane information indicates the width of the link and the number of lanes.

The link shape is data representing the road shape of the link, and includes a number of shape interpolation points and a shape coordinate list. The shape interpolation point is the apex when the road shape of the link is represented by a polygonal line. When the road shape is a straight line connecting the start point node and the end point node, the number of shape interpolation points is set to zero.

The shape coordinate list is a list in which the coordinates of the shape interpolation points are listed. The shape interpolation point does not include the start point node and the end point node. The coordinates of the shape interpolation point are represented in latitude and longitude. The coordinates of the shape interpolation point may be represented by the latitude and longitude of the shape interpolation point, or may be represented by the latitude and longitude relative to the previous shape interpolation point.

When the coordinates of the shape interpolation point are represented by the relative latitude and longitude, the coordinates of the first shape interpolation point are represented by the latitude and longitude relative to the start point node. The link shape may be represented by an interpolation line instead of an interpolation point.

The lane link information includes a lane link ID, a lane start point node ID, a lane end point node ID, a road structure type, a lane link shape, lane marking information, and regulation information. The lane link ID is used to identify each lane link in the road link. The lane start point node ID represents the node ID of the lane start point node which is the node on the start point side of the lane link. The lane end point node ID represents the node ID of the lane end point node which is the node on the end point side of the lane link. The lane marking information is information about marking of lane, and represents a line type of the marking of lane and a road marking type. The line type of the line marking includes a color or type such as a white dotted line, a white solid line, and a yellow solid line. The road marking type includes, for example, a deceleration marking. Regulation information represents traffic restrictions or speed limits for the lane links.

The road structure type represents the road structure of the lane, and there are classifications such as a normal lane, a branch lane, a merging lane, a bus lane, and an HOV lane.

The lane link shape is data representing the shape of the lane link, and includes the number of shape interpolation points and the lane link shape information list. The number of shape interpolation points represents the number of shape interpolation points which are the apexes when the shape of the lane link is represented by a polygonal line. The lane link shape information list is a list in which coordinates of the shape interpolation point, an elevation, a vertical gradient and a transverse gradient of the shape interpolation points, width, radius of curvature, and curvature are listed. The transverse gradient is a gradient from the shape interpolation point to the next shape interpolation point.

Figure 7:
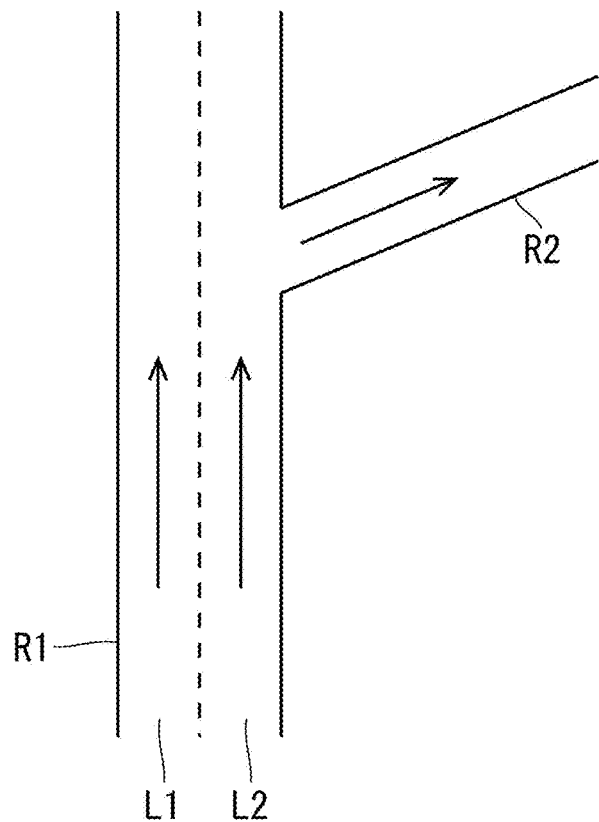
FIG. 7 An image diagram of a road.
Figure 9:
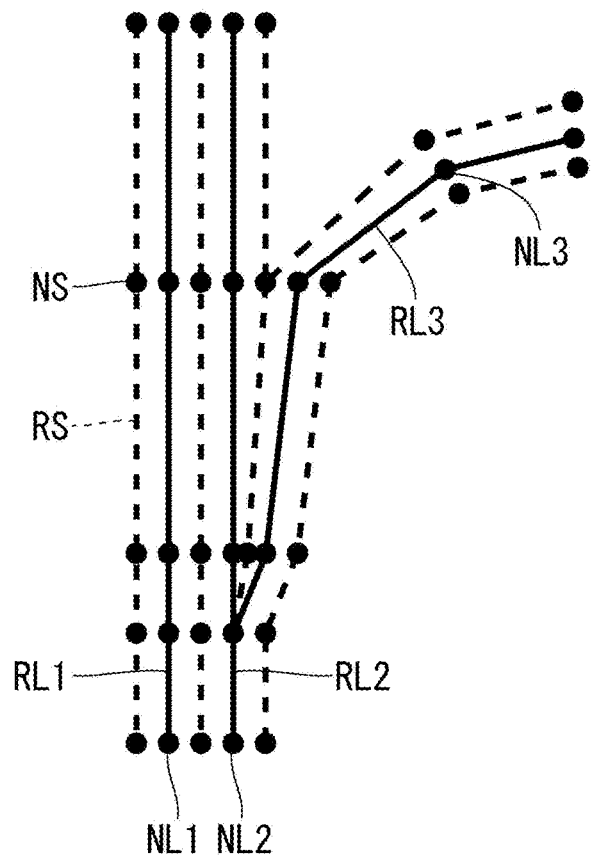
FIG. 9 An image diagram of a road based on lane link data.

FIGS. 7 to 9 illustrate the relationship between an actual road and road network data. FIG. 7 illustrates an actual road. FIG. 7 illustrates a main line R1 including a left lane L1 and a right lane L2, and a branch line R2 branching from the right lane L2 of the main line R1. FIG. 8 illustrates an image of the road illustrated in FIG. 7 based on the road link data. According to the road link data, the road is represented by seven road nodes NR and six road links RR. The road links RR indicate the middle position in the width direction of the road. FIG. 9 illustrates an image of the road illustrated in FIG. 7 based on the lane link data. According to the lane link data, the left lane L1 is represented by the five lane nodes NL1 and the four lane links RL1 connecting the lane nodes NL1, and the right lane L2 is represented by the five lane nodes NL2 and four lane link RL2 connecting the lane nodes NL2. Also, the branch line R2 is represented by the four lane nodes NL3 and the lane links RL3 that connect between the lane nodes NL3 or between the lane node NL3 and the lane node NL2. Also, lane marking nodes NS are arranged on both sides of lane nodes NL1 and NL2, and the lane markings are represented by the lane marking nodes NS and the lane marking links RS connecting between the lane marking nodes NS. Information on the lane marking node NS and the lane marking link RS is stored as lane marking information in the lane link data as illustrated in FIG. 5. The lane links RL1, RL2, and RL3 indicate the middle position in the width direction of each lane.

<B-4. Road Map Image>

Figure 10:
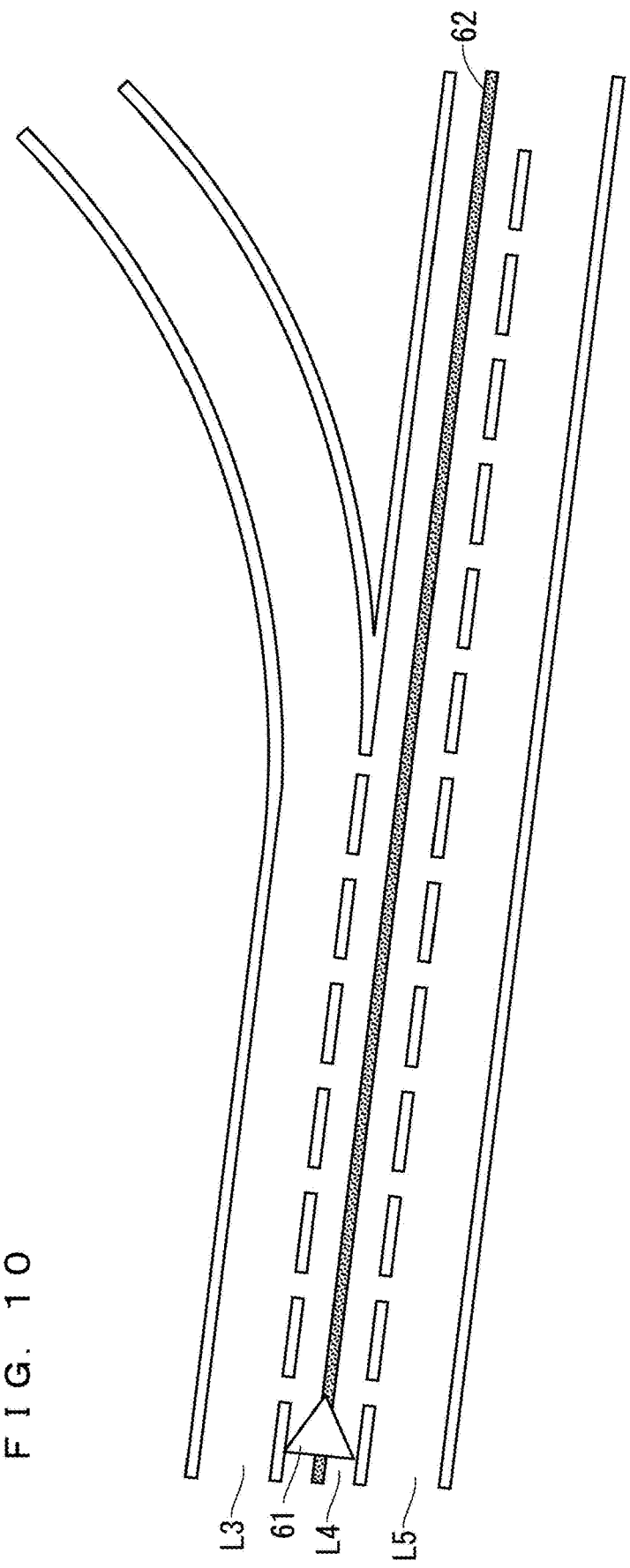
FIG. 10 A diagram illustrating a road map image by a map display device of a comparative example.

As described above, the display control unit 20 creates the road map image. As a comparative example, FIG. 10 illustrates a road map image showing traffic information for each road. In creating the road map image of FIG. 9, the control unit 19 acquires the position information of the vehicle from the current position detection unit 13. Then, the control unit 19 acquires the road network data covering the current position of the vehicle from the map data storage unit 11. Then, the traveling link determination unit 23 acquires the position information of the vehicle and the map data from the control unit 19, collates them, and specifies the road link on which the vehicle is traveling as a traveling link. Next, the control unit 19 acquires the traffic information of the traveling link and the road links around the traveling link from the traffic information acquisition unit 14. The display control unit 20 creates a road map image including a road including three lanes L3, L4, and L5, a vehicle icon 61 indicating the current position of the vehicle, and a traffic information line 62 indicating the traffic information of the road link. The traffic information line 62 is superimposed on any of the lanes of the road, and in the example of FIG. 9, it is superimposed on the lane L4. The traffic information line 62 represents the degree of congestion on the road. In FIG. 9, although the traffic information line 62 is hatched in shading tone, the degree of congestion can be expressed by the color or hatching of the traffic information line 62. For example, a green traffic information line indicates a low degree of congestion, a yellow traffic information line indicates a medium degree of congestion, and a red traffic information line indicates a high degree of congestion. In this manner, when a degree of congestion of a road is indicated by the traffic information line 62, the traffic information can be obtained only for each road link even for a road having a plurality of lanes. Further, the traffic information line 62 is displayed superimposed on any of the lanes; therefore, the user has the impression that no traffic information exists in the lane other than the lane on which the traffic information line 62 is superimposed.

Figure 11:
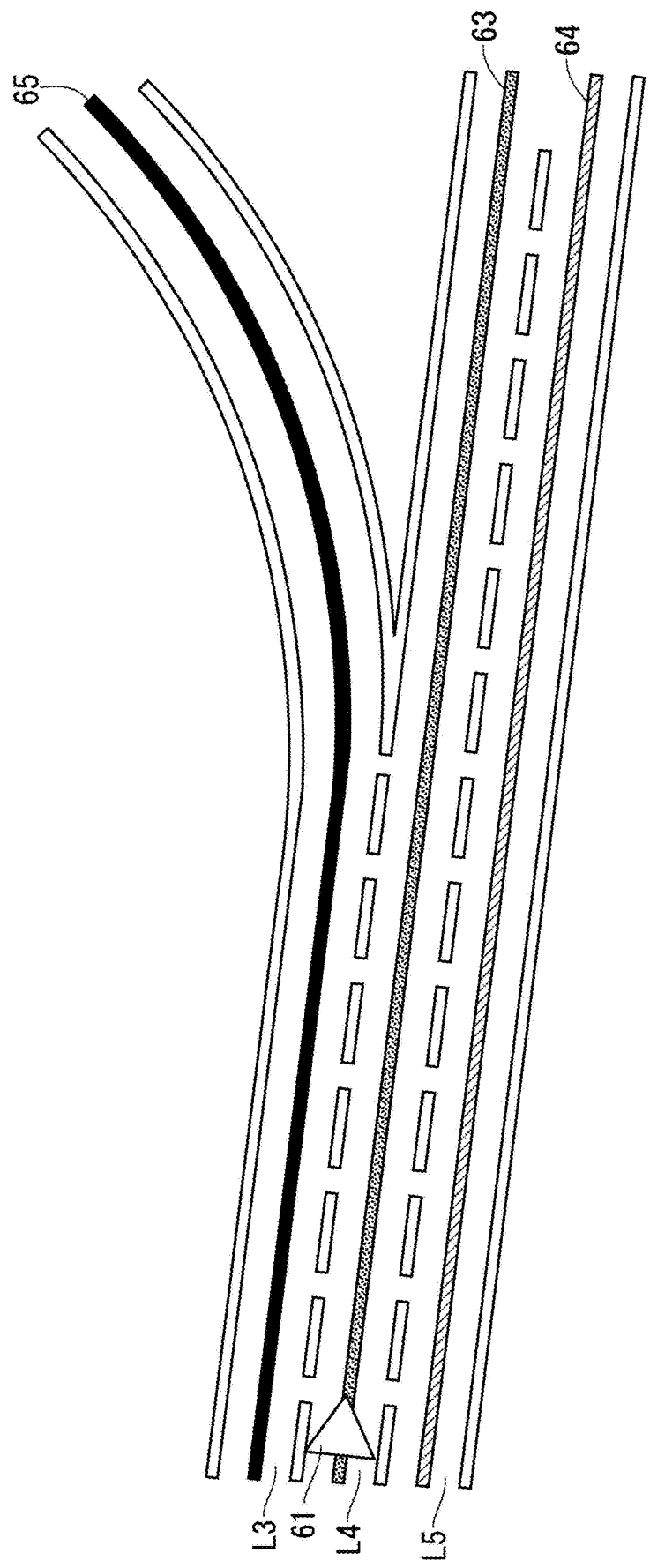
FIG. 11 A diagram illustrating a road map image by a map display device of Embodiment 2.

Therefore, as illustrated in FIG. 11, the map display device 102 displays traffic information for each lane link. When displaying as illustrated in FIG. 11 is performed, the control unit 19 acquires traffic information of all the lane links constituting the road links around the vehicle from the traffic information acquisition unit 14. The display control unit 20 creates a road map image including the road on which the vehicle is traveling, the vehicle icon 61 indicating the current position of the vehicle, and the traffic information lines 63 to 65 indicating the traffic information of each lane link, and causes the display unit 26 to display the road map image. An example of traffic information is the degree of traffic congestion. In FIG. 11, the darkest traffic information line 65 indicates that the degree of congestion of the lane L3 is high, and the diagonally hatched traffic information line 64 indicates that the degree of congestion of the lane L5 is medium, and the traffic information line 63 hatched in shading tone indicates that the degree of congestion of the corresponding lane is low. This enables the user to grasp the degree of congestion for each lane, ensuring the appropriate selection of a lane with a low degree of congestion and traveling thereon. Hereinafter, a lane with a high degree of congestion is referred to as a heavily-congested lane, a lane with a medium degree of congestion is referred to as a congested lane, and a lane with a low degree of congestion is referred to as a smooth lane.

Although in FIG. 11, the degrees of congestion are illustrated in a three-tier manner with hatching patterns of the traffic information lines, more increased tiers for degrees of congestion may be set and the number of the subdivided display modes of the traffic information line corresponding to the number of tiers may be adoptable. Further, the traffic information indicated by the traffic information lines 63 to 65 is not limited to the actual value measured from the current traffic volume or the like, but may also be a prediction value calculated from the past traffic volume or the like. In this case, the prediction value may be the current value or the prediction value at the time when the vehicle travels in the section represented by the traffic information line. In FIG. 11, the degrees of congestion are given as an example of the traffic information, but the traffic information is not limited to the degrees of congestion. For example, the traffic information may include information such as accidents or constructions. In this case, the traffic information may be displayed in a form different from the traffic information lines 63 and 64 in FIG. 11, such as arrows, line segments, and icons.

Figure 12:
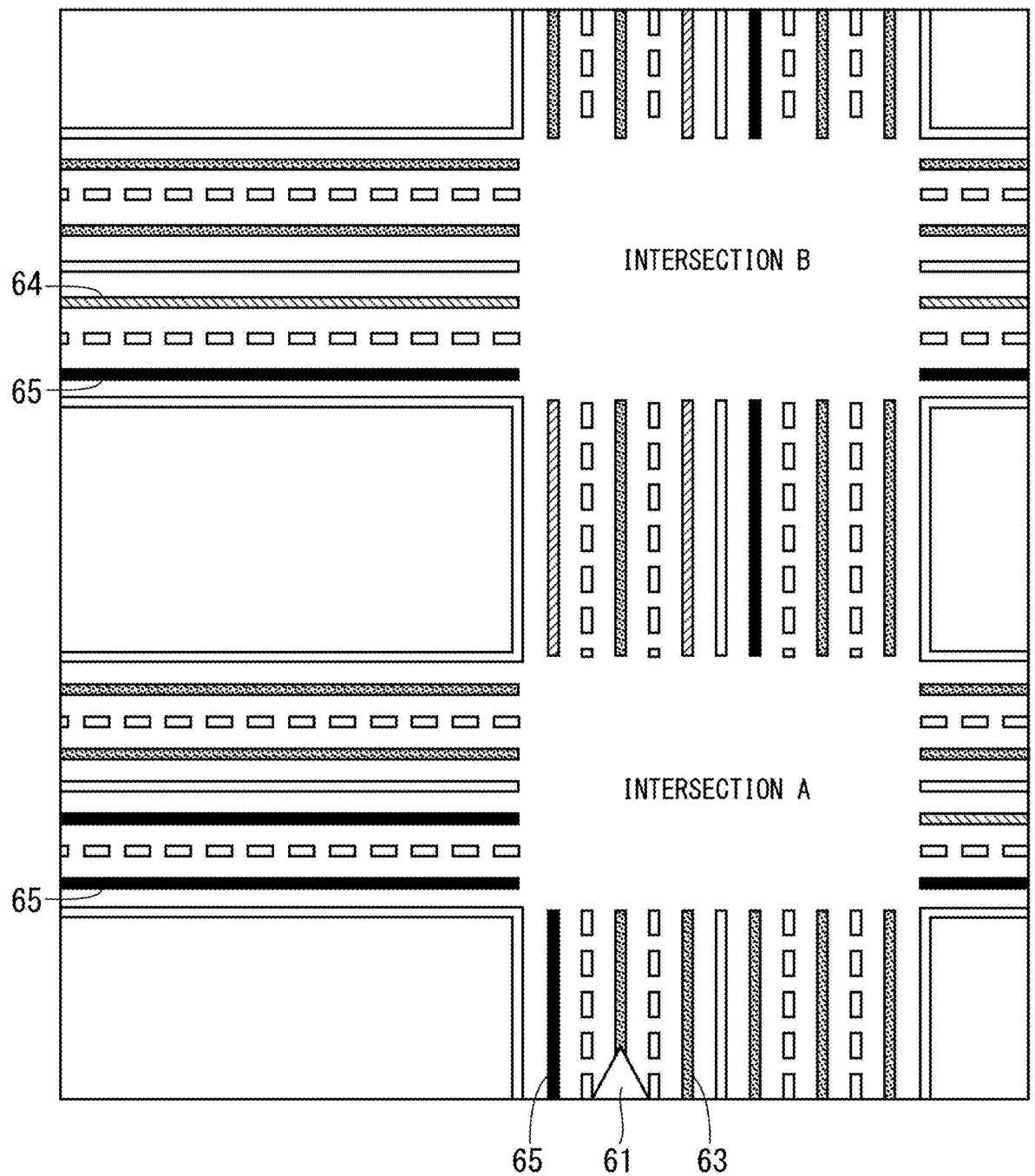
FIG. 12 A diagram illustrating a road map image by the map display device of Embodiment 2.

FIG. 12 illustrates a wider range of road map images than that of FIG. 11. The road map image of FIG. 12 is a road map image with a geographical range including an intersection A ahead on the road on which the vehicle travels and an intersection B further ahead of the intersection A. Such a road map image with the geographical range allows the user to select an appropriate travelling route. Specifically, an example is given in which the user is intending to make a left turn at the intersection A or the intersection B. However, if the user makes a left turn at the intersection A as illustrated by an arrow 51 in FIG. 13, smooth traveling will be hampered because both lanes in the road ahead are heavily-congested lanes. Meanwhile, unlike the case of making a left turn at the intersection A, if the user makes a left turn at the intersection B as illustrated by an arrow 52 in FIG. 13, smooth traveling is enabled by the choice of traveling the congested lane between one heavily-congested lane and one congested lane in the road ahead. In this manner, in the road map image, the traffic information lines indicating the degrees of congestion are superimposed for each lane of the road around the current position of the vehicle, so that the user can select and travel a route with a low degree of congestion.

Figure 14:
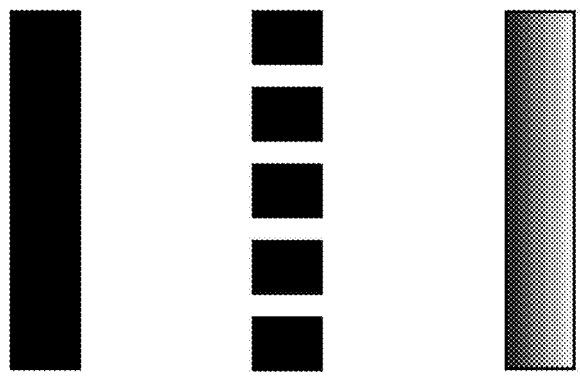
FIG. 14 A diagram illustrating a design pattern of traffic information lines.

In the above, the description has been made in which the color or hatching of the traffic information line is changed in accordance with the traffic information represented by the traffic information line. Various other display modes other than this are assumed for the traffic information line. For example, as illustrated in FIG. 14, an intermittent line or a gradation pattern may be used as the traffic information line.

Figure 15:
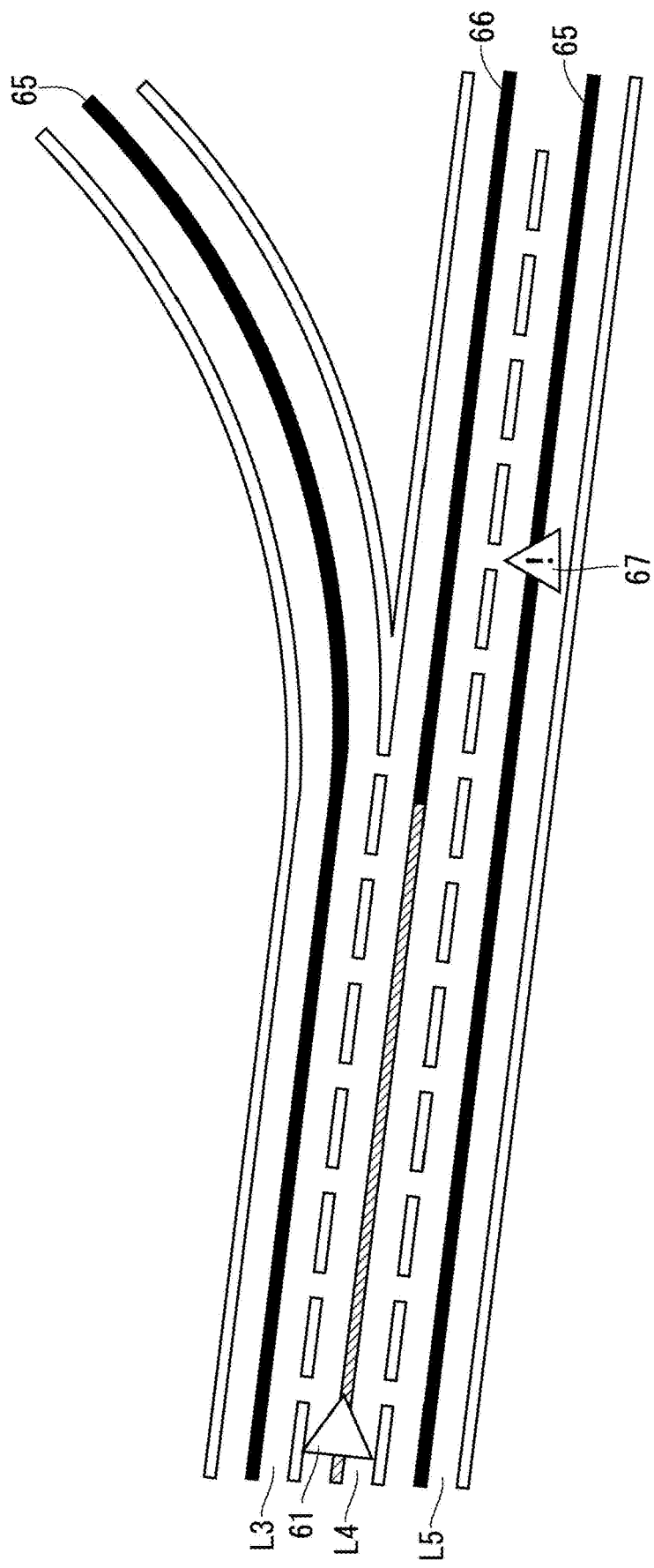
FIG. 15 A diagram illustrating the traffic information lines and traffic information icons.

FIG. 15 illustrates a road map image when a traffic accident occurs ahead of the vehicle. In this case, the traffic information acquisition unit 14 acquires information on the location and lane where the accident occurred as traffic information. Icon 67 is superimposed on the lane L5 where the accident occurred, indicating that the accident occurred at the display point of icon 67. The darkest traffic information line 65 is superimposed on both lanes L3 and L5, indicating that they are the heavily-congested lanes. In addition, the traffic information line 66 superimposed on the lane L4 is divided into a diagonal hatching area and a darkest area, indicating that heavy traffic congestion starts around the accident occurrence point. Here, although the traffic information line 66 is divided into a diagonal hatched area and a darkest area, the traffic information line 66 may be indicated by a gradation pattern gradually changing from yellow to red, for example. This indicates that the degree of congestion is gradually increasing in lane L4.

In the above example, the traffic information is superimposed and displayed on the road map image. However, when the display unit 26 is performing other displays such as the menu screen of the map display device, for example, the voice output control unit 21 may output the voice for conveying the traffic information to the user from the voice output unit 27.

C. Embodiment 3

<C-1. Configuration>

Figure 16:
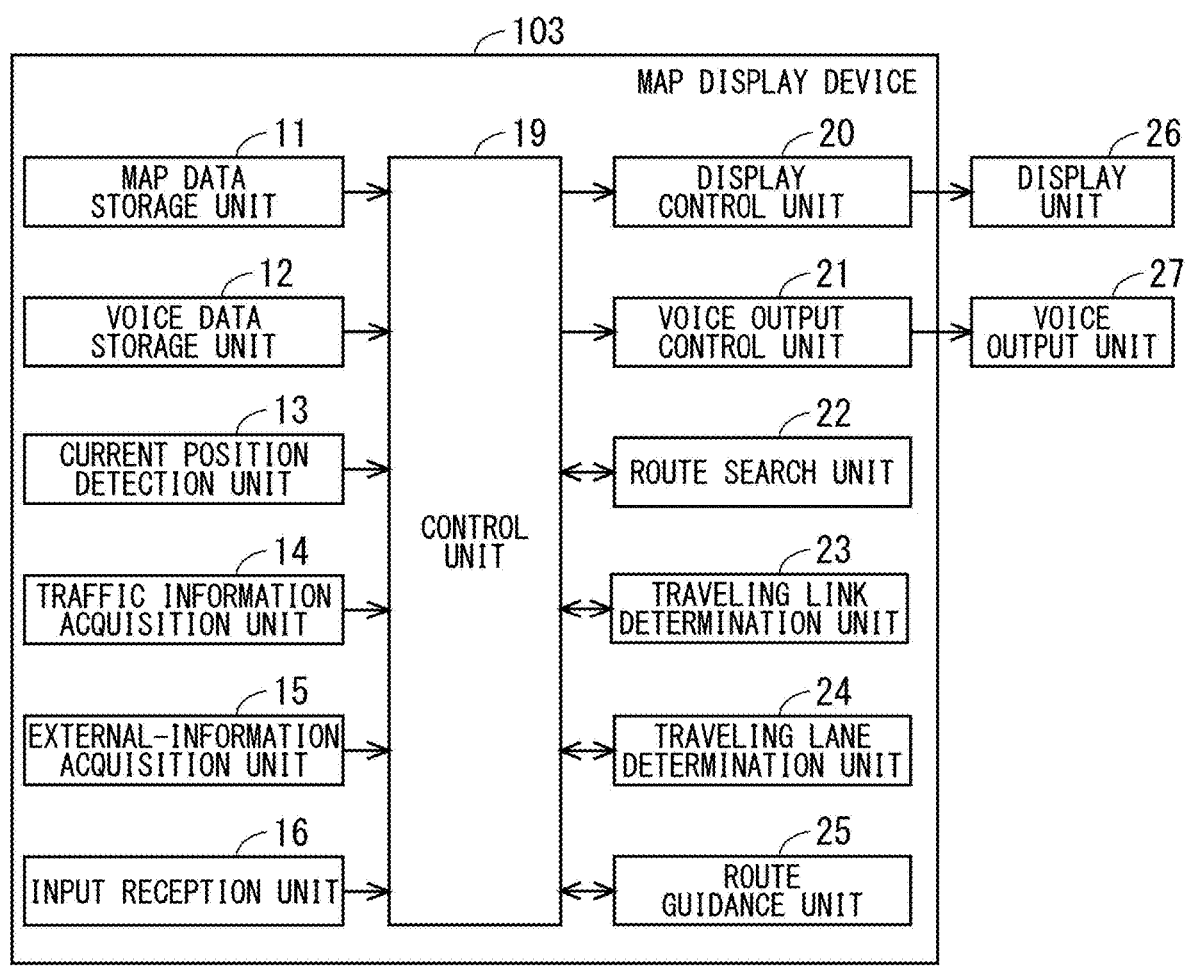
FIG. 16 A block diagram illustrating a functional configuration of a map display device according to Embodiment 3.

FIG. 16 is a block diagram illustrating a functional configuration of a map display device 103 according to Embodiment 3. The map display device 103 includes a voice data storage unit 12, a route search unit 22, and a route guidance unit 25, in addition to the configuration of the map display device 102 according to Embodiment 2.

The voice data storage unit 12 stores voice data of voice guidance messages for guiding the vehicle to travel on the road. The voice guidance messages are classified into fixed pattern voices and word voices and stored in the voice data storage unit 12. The fixed pattern voices are voices having fixed patterns set for each type of voice guidance. Word voices are voices including specific values such as distances and place names. A desired voice can be obtained by combining fixed pattern voices and word voices.

The route search unit 22 searches a route from the current position of the vehicle detected by the current position detection unit 13 to the destination input with the input reception unit 16 based on the map data acquired from the map data storage unit 11 and stores the data of the searched route. The route search unit 22 searches, for example, a route that takes a shortest time to arrive (time priority route), a route with shortest distance (distance priority route), a route with the least fuel to be consumed (fuel priority route), a route that incorporates toll roads as much as possible (toll road priority route) a route that incorporates general roads as much as possible (general road priority route), or a route having a favorable balance of time, distance, and cost (standard route).

The route guidance unit 25 outputs guidance information for guiding the vehicle to the destination along the search route by the route search unit 22 to the display control unit 20 or the voice output control unit 21. The guidance information includes information on recommended traveling lane routes. A recommended traveling lane route is a lane route that is recommended to travel in consideration of traffic information when traveling along the searched route. The route guidance unit 25 selects at least one lane as a recommended lane for each road link of the searched route searched by the route search unit 22 based on the traffic information of each lane. Then, the route guidance unit 25 sets a route in which the recommended lane is connected to a plurality of continuous road links of the searched route as a recommended traveling lane route. The map display device 103 uses map data having lane links; therefore, setting a traveling route for each lane in this manner is enabled. The recommended traveling lane route must be a lane route that is available for the vehicle to travel. Therefore, the recommended lane must be the same lane or an adjacent lane between two consecutive road links. In this manner, the route guidance unit 25 functions as a lane route setting unit for setting a recommended traveling lane route.

<C-2. Road Map Image>

FIG. 17 is a diagram illustrating a road map image by the map display device 103. The road map image by the map display device 103 illustrates a recommended traveling lane route 53 and an available lane route 54 in addition to the display contents of the road map image by the map display device 102 illustrated in FIG. 12. Here, the route search unit 22 has searched a route to make a left turn at the intersection B, and the route guidance unit 25 has set a recommended traveling lane route 53 and an available lane route 54 for the route. From the viewpoint of traffic information, although traveling as smooth as traveling through the recommended traveling lane route 53 is not expected, the available lane route 54 is a route of which lane is available to travel.

The recommended traveling lane route 53 and the available lane route 54 are displayed by shading on the corresponding lane routes of the road map image in the example of FIG. 17. The recommended traveling lane route 53 is a route selected as a route for traveling which is lower in degree of congestion than the available lane route 54. In this manner, the display control unit 20 shows the recommended traveling lane route 53 in a mode different from that of other lanes.

By displaying the road map image as illustrated in FIG. 17 on the display device 39, the driver can visually grasp the smoothest lane to travel in the route to the destination. Further, the voice output control unit 21 may cause the voice output unit 27 to output a voice for guiding the driver on the recommended traveling lane route 53. Accordingly, the driver can aurally grasp the smoothest lane to travel in the route to the destination.

Figure 18:
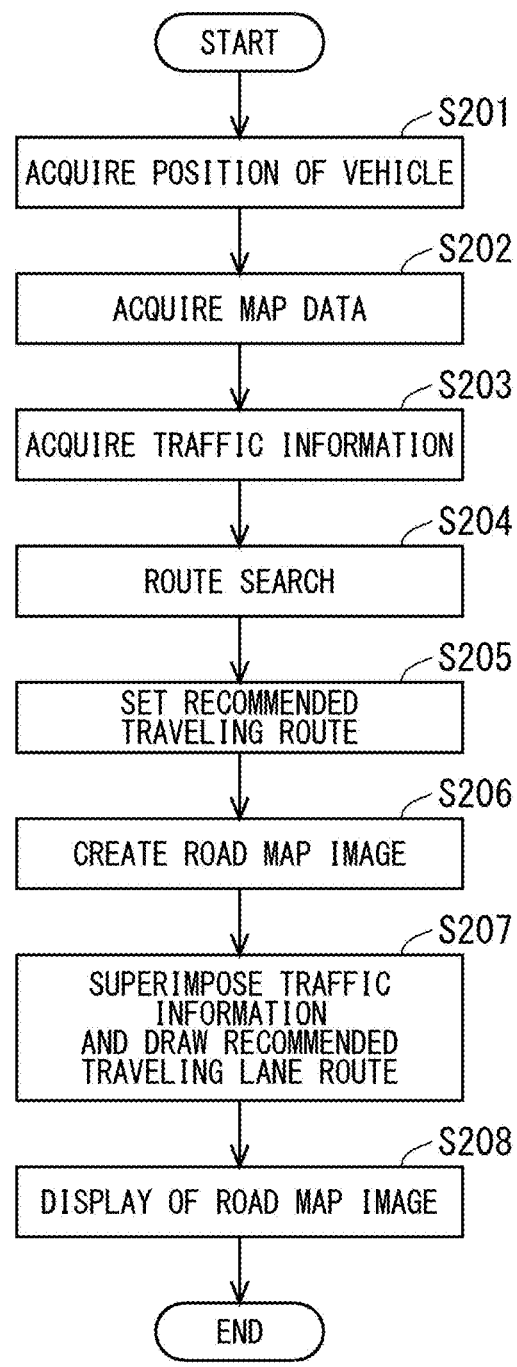
FIG. 18 A flowchart illustrating the operation of the map display device according to Embodiment 3.

FIG. 18 is a flowchart illustrating the operation of the map display device 103 that realizes the display of the road map image in FIG. 17. Hereinafter, the operation of the map display device 103 will be described along with the flow of FIG. 18. The flow of FIG. 18 starts at the timing when, for example, the accessory power of the vehicle is turned on and the power of the map display device 103 is turned on. First, the current position detection unit 13 detects and outputs the current position of the vehicle to the control unit 19 (Step S201). Next, the control unit 19 acquires the map data of the geographical range necessary for creating the map in the vicinity of a subject vehicle position based on the current position of the vehicle from the map data storage unit 11 (Step S202). Next, the traffic information acquisition unit 14 acquires traffic information for each respective lane in the geographical range of the map data acquired in Step S202, and outputs the traffic information to the control unit 19 (Step S203). Next, the route search unit 22 acquires the map data, the current position of the vehicle, and the destination from the control unit 19, and searches the route from the current position of the vehicle to the destination (Step S204). The route search unit 22 outputs the searched route to the control unit 19. The destination of the vehicle is input to the input reception unit 16 by the user, for example, and is output from the input reception unit 16 to the control unit 19.

Next, the route guidance unit 25 acquires the searched route and the traffic information of each lane of the searched route from the control unit 19, and sets the recommended traveling lane route (Step S205). The route guidance unit 25 outputs the recommended traveling lane route to the control unit 19. Next, the display control unit 20 acquires the traffic information and the map data from the control unit 19 and creates a road map image from them (Step S206). Next, the display control unit 20 superimposes the traffic information on the corresponding lane on the road map image, and further draws the recommended traveling lane route (Step S207). The display control unit 20 draws the recommended traveling lane route in a manner that the recommended traveling lane route and other lanes are in different modes in a road map image. And the display control unit 20 causes the display unit 26 to display the road map image (Step S208).

In the flow of FIG. 18, the acquisition of map data is described in Step S202, and the creation of a road map image is described in Step S206. However, these Steps may be performed separately for map data on road shapes and map data on other map items. Other map items include symbols and the like displayed on the map and. That is, when acquiring the map data from the map data storage unit 11, the control unit 19 separately acquires the map data on road shapes and the map data on other map items. Then, when creating the road map image, the display control unit 20 separately performs the drawing of road shapes and the drawing of other map items.

The map display device 103 of Embodiment 3 includes the current position detection unit 13 served as a position information acquisition unit that acquires the position information of the vehicle, The route search unit 22 that searches a travel route for the vehicle based on the position information of the vehicle, the route guidance unit 25 served as a lane route setting unit selects, based on the traffic information of each lane of the traveling route, at least one lane as the recommended lane for each section of the traveling route, and sets a route in which the recommended lane is connected to a plurality of continuous sections of the traveling route as the recommended traveling lane route. Then, the display control unit 20 sets the recommended lane route in a display mode different from other lanes in the road map image. Therefore, according to the map display device 103, the driver can grasp not only the traffic information of each lane shown on the road map image but also the route of each lane recommended for traveling based on the traffic information.

D. Hardware

Figure 19:
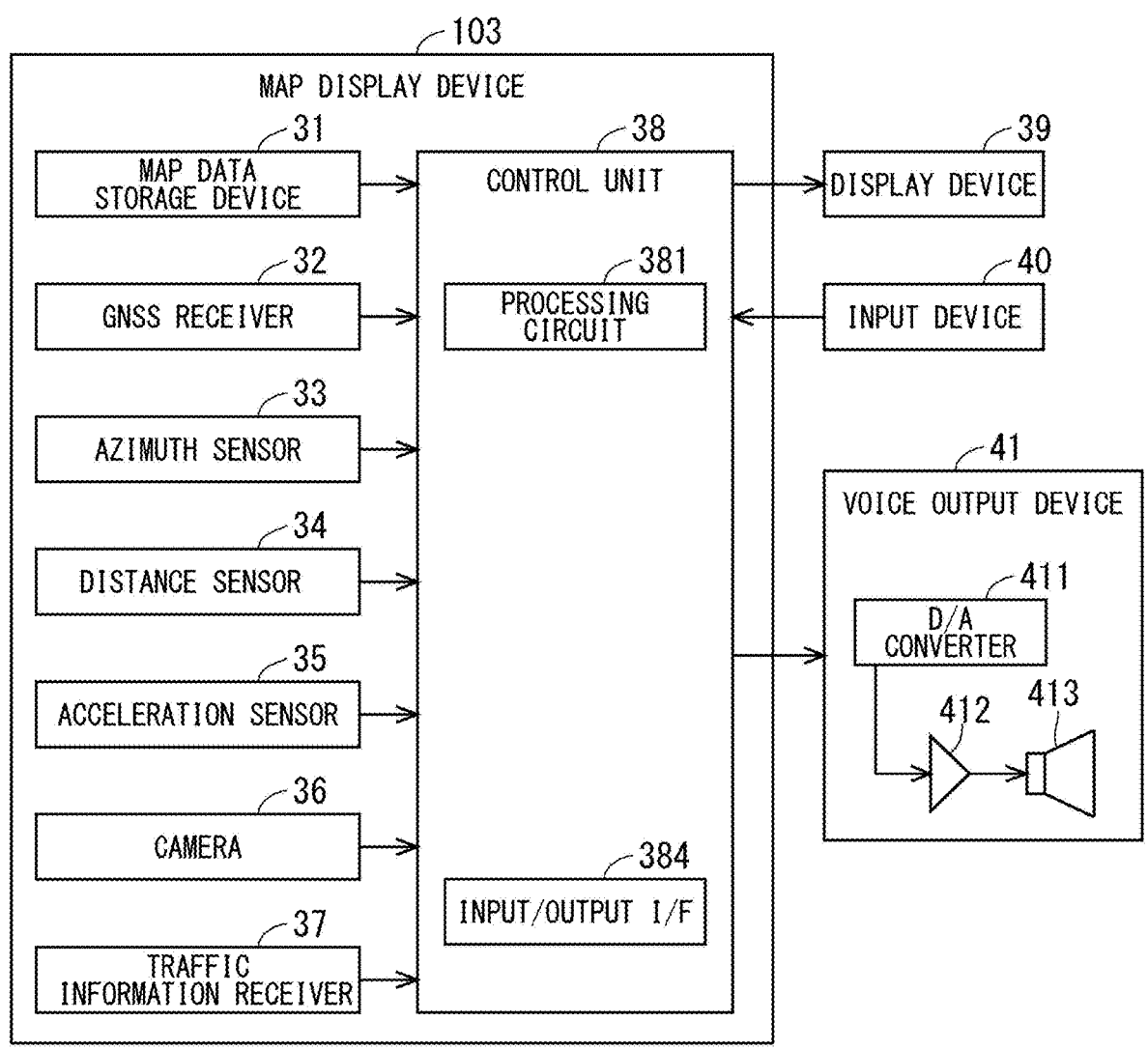
FIG. 19 A block diagram illustrating a hardware configuration diagram of the map display device according to Embodiment 3.

FIG. 19 is a block diagram illustrating a hardware configuration of the map display device 103. The map display device 103 includes a map data storage device 31, a GNSS receiver 32, an azimuth sensor 33, a distance sensor 34, an acceleration sensor 35, a camera 36, a traffic information receiver 37, a control unit 38, a display device 39, an input device 40, and a voice output device 41. The map data storage device 31 includes an HDD device, a DVD and its drive device, or a storage device such as a semiconductor memory, and corresponds to the map data storage unit 11 and the voice data storage unit 12.

The GNSS receiver 32 is mounted on the vehicle, receives radio waves transmitted from GPS satellites and the like, and measures the current position of the vehicle. The GNSS receiver 32 outputs measurement results such as position, azimuth, and speed to the control unit 38. The azimuth sensor 33 is mounted on the vehicle, outputs the angular velocity of the vehicle at predetermined intervals, and detects the azimuth of the vehicle based on the output. The distance sensor 34 is mounted on the vehicle, outputs a pulse signal according to the moving distance of the vehicle, and detects the moving distance of the vehicle based on the pulse signal. The acceleration sensor 35 is mounted on the vehicle and outputs the acceleration in the sensor coordinate system at predetermined intervals. The GNSS receiver 32, the azimuth sensor 33, the distance sensor 34, and the acceleration sensor 35 correspond to the current position detection unit 13 in FIG. 1.

The control unit 38 performs various calculations and controls of the entire map display device 102. The control unit 38 includes a processing circuit 381 and an input/output interface (I/F) 384. Dedicated hardware or a processor that executes a program stored in a memory may be applied to the processing circuit 381. For example, the processor corresponds to a central processing unit, a processing unit, an arithmetic unit, a microprocessor, a microcomputer, a Digital Signal Processor (DSP), or the like.

The processing circuit 381 realizes a voice recognition function of the input reception unit 16, the control unit 19, the display control unit 20, the voice output control unit 21, the route search unit 22, the travel link determination unit 23, the travel lane determination unit 24, and the route guidance unit 25. The input/output I/F 384 controls the input/output between the control unit 38 and other configurations.

When the dedicated hardware is applied to the processing circuit 381, the processing circuit 381 corresponds to a single circuit, a composite circuit, a programmed processor, a parallel programmed processor, an Application Specific Integrated Circuit (ASIC), or a Field-Programmable Gate Array (FPGA), or the combination thereof. Each of the functions of each unit such as a control unit 19 may be realized by a plurality of processing circuits 381, or may be realized by one processing circuit with each of the functions of the respective parts are integrated.

Figure 20:
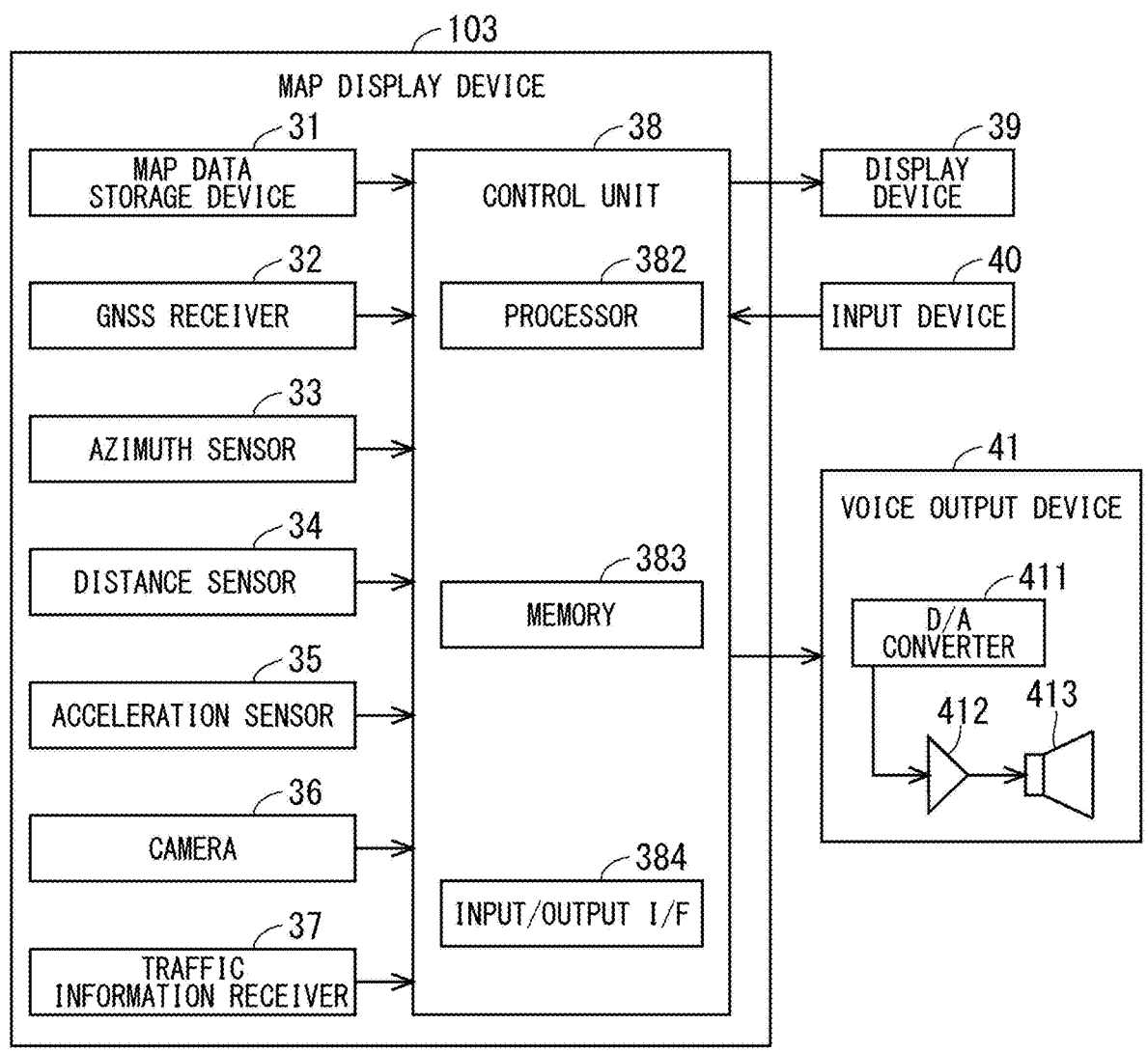
FIG. 20 A block diagram illustrating a hardware configuration diagram of the map display device according to Embodiment 3.

When the processing circuit 381 is a processor, the functions of the control unit 19 and the like are realized by a combination with software (software, firmware, or software and firmware) or the like. Software and the like are described as programs and stored in a memory. As illustrated in FIG. 20, the processor 382 applied to the processing circuit 381 realizes the functions of each unit by reading and executing the program stored in a memory 383. That is, the map display device 103 includes the memory 383 for storing the program that, when executed by the processing circuit 381, eventually executes obtaining the traffic information for roads consisting of a plurality of lanes for each lane, creating a road map image that represents a road for each lane using map data that includes lane link data, causing a display device mounted on the vehicle to display the road map image. In other words, this program can be said to cause the computer to execute the procedure or method of the control unit 19 or the like. Here, the memory 383 may be, for example, a non-volatile or volatile semiconductor memory, such as a random access memory (RAM), a read only memory (ROM), a flash memory, an erasable programmable read only memory (EPROM), an electrically erasable programmable read only memory (EEPROM), or the like, a hard disk drive (HDD), a magnetic disk, a flexible disk, an optical disk, a compact disk, a mini disk, a digital versatile disk (DVD) and a drive device therefor, or any storage medium used in the future The camera 36 captures the surroundings of the vehicle and acquires information outside the vehicle by performing image processing on the captured image data. The camera 36 corresponds to the external-information acquisition unit 15.

The traffic information receiver 37 is a device that receives traffic information, and is, for example, a Frequency Modulation (FM) multiplex receiver, a beacon receiver, a Traffic Message Channel (TMC) receiver, or the like. The traffic information receiver 37 corresponds to the traffic information acquisition unit 14.

The display device 39 is, for example, a liquid crystal display device or a Head-Up Display (HUD), and displays display data acquired from the control unit 38. The display device 39 corresponds to the display unit 26.

The input device 40 is composed of a remote controller, a touch switch, or the like, and provides various instructions to the map display device 103, such as inputting of the destination or switching of a screen to be displayed on the display device 39.

The voice output device 41 includes a D/A converter 411, an amplifier 412, and a speaker 413. The D/A converter 411 converts a digital signal of the voice guidance message read from the control unit 38 into the voice of the analog signal. The amplifier 412 amplifies the voice of the analog signal of the voice guidance message. The speaker 413 outputs the sound amplified by the amplifier 412. The voice output device 41 corresponds to the voice output unit 27.

The configuration in which each function of the control unit 19 or the like is realized by either hardware or software has been described above. However, the present invention is not limited thereto, and a configuration in which part of the control unit 19 or the like is realized by dedicated hardware and another part is realized by software or the like may be adoptable. For example, the function of the control unit 19 is realized by a processing circuit as dedicated hardware, and other functions are realized by the processing circuit 381 as the processor 382 reading and executing the program stored in the memory 383.

As described above, the processing circuit can realize the functions described above by hardware, software, or the like, or a combination thereof.

Figure 21:
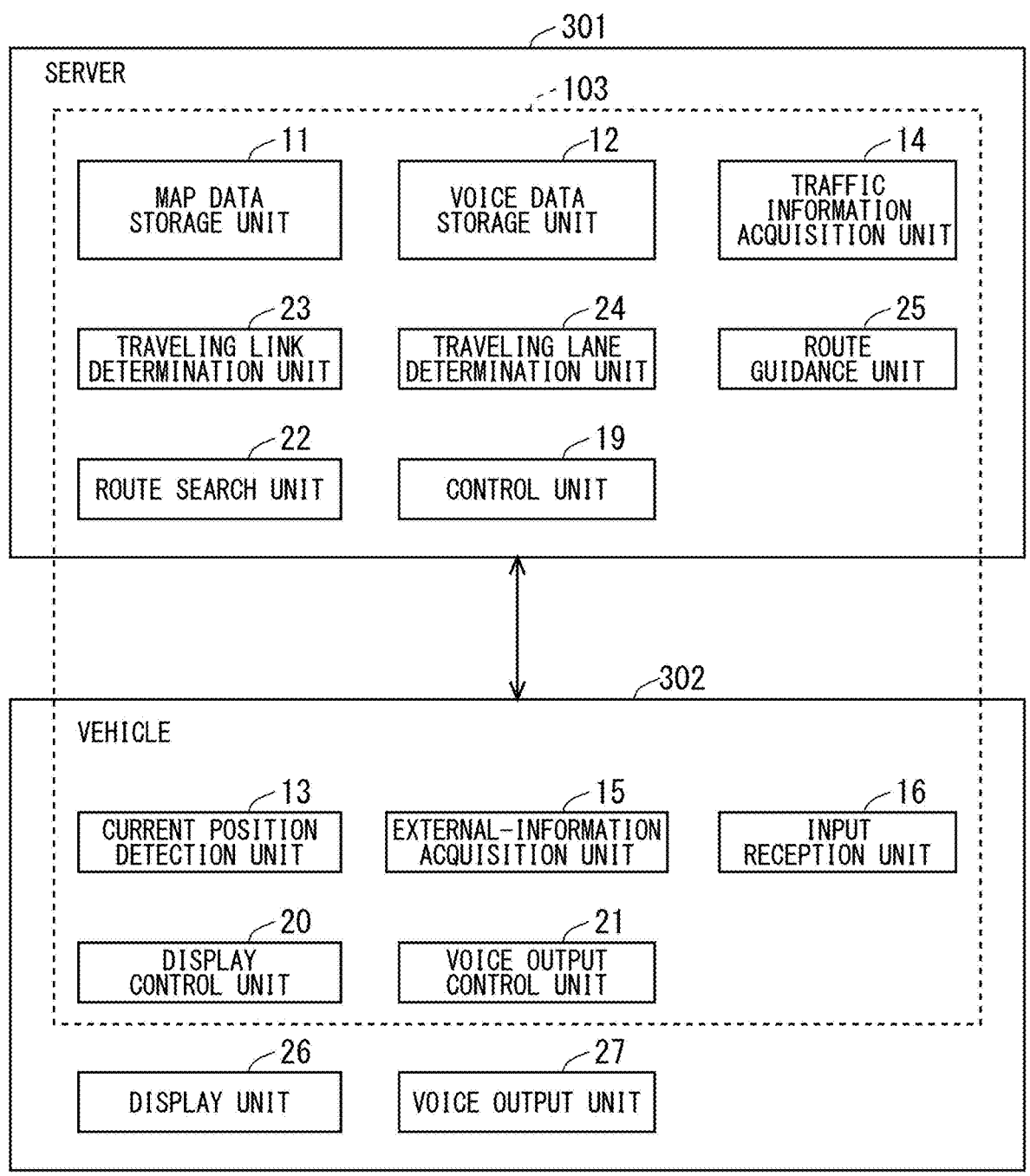
FIG. 21 A diagram illustrating a configuration example of the map display device according to Embodiment 3 configured by a server and a vehicle.

Further, although the map display device has been described above as an in-vehicle device, the map display device can also be applied to an in-vehicle device, a Portable Navigation Device (PND), a communication terminal (e.g. a mobile terminal such as a cell phone, a smartphone, and a tablet), and the features of the applications installed on them, and a system constructed as a system by appropriately combining servers. In this case, each function or each component of the map display device described above may be distributed to each device composing the system, or may be concentrated to any device. FIG. 21 illustrates a configuration example of the map display device 103 by a server 301 and a vehicle 302. In this example, the map data storage unit 11, the voice data storage unit 12, the traffic information acquisition unit 14, the control unit 19, the route search unit 22, the travel link determination unit 23, the travel lane determination unit 24, and the route guidance unit 25 are arranged in the server 301, and the current position detection unit 13, the external-information acquisition unit 15, the input reception unit 16, the display control unit 20, and the voice output control unit 21 are arranged in the vehicle 302. The display unit 26 and the voice output unit 27 are also arranged in the vehicle 302.

It should be noted that Embodiments of the present invention can be arbitrarily combined and can be appropriately modified or omitted without departing from the scope of the invention. While the invention has been described in detail, the forgoing description is in all aspects illustrative and not restrictive. It is understood that numerous other modifications and variations can be devised without departing from the scope of the invention.

EXPLANATION OF REFERENCE SIGNS 11 map data storage unit, 12 voice data storage unit, 13 current position detection unit, 14 traffic information acquisition unit, 15 external-information acquisition unit, 16 input reception unit, 19 control unit, 20 display control unit, 21 voice output control unit, 22 route search unit, 23 travel link determination unit, 24 route search unit, 25 route guidance unit, 26 display unit, 27 voice output unit, 31 map data storage device, 32 GNSS receiver, 33 azimuth sensor, 34 distance sensor, 35 acceleration sensor, 36 camera, 37 traffic information receiver, 38 control unit, 39 display device, 40 input device, 41 voice output device, 53 recommended traveling lane route, 54 available lane route, 61 vehicle icon, 62 to 66 traffic information line, 67 icon, 101, 102, 103 map display device, 381 processing circuit, 382 processor, 383 memory, 384 input/output interface, 411 D/A converter, 412 amplifier, 413 speaker.

The invention claimed is:

1. A map display method comprising:

acquiring traffic information for each lane of a road including a plurality of lanes, traffic information for a first road intersecting the road at a first intersection and traffic information for a second road intersecting the road at a second intersection ahead of the first intersection;

creating a road map image representing the road for each lane, a road map image representing the first road, and a road map image representing the second road using map data having lane link data representing the road by links for each lane, and map data for the first road and the second road; and causing a display device mounted on a vehicle to display the road map image, wherein the traffic information is superimposed on the corresponding lane, the first road, and the second road in the road map image and includes at least any of information on degree of congestion and information on a place where an accident occurs.

2. A map display device comprising:

a traffic information receiver configured to acquire traffic information for each lane of a road including a plurality of lanes, traffic information for a first road intersecting the road at a first intersection and traffic information for a second road intersecting the road at a second intersection ahead of the first intersection; and a display control circuitry configured to create a road map image representing the road for each lane, a road map image representing the first road, and a road map image representing the second road using map data having lane link data representing the road by links for each lane, and map data for the first road and the second road, and cause a display device mounted on a vehicle to display thereof, wherein the display control circuitry is configured to superimpose the traffic information on the corresponding lane, the first road, and the second road in the road map image, and the traffic information includes at least any of information on degree of congestion and information on a place where an accident occurs.

3. The map display device according to claim 2, further comprising:

a current position detection circuitry configured to acquire position information of the vehicle;

a route search circuitry configured to search a travel route for the vehicle based on the position information of the vehicle; and a lane route setting circuitry configured to select, based on the traffic information of each lane of the traveling route, at least one lane as a recommended lane for each section of the traveling route, and sets a route in which the recommended lane is connected to a plurality of continuous sections of the traveling route as the recommended traveling lane route, wherein the display control circuitry is configured to set the traveling recommended lane route in a display mode different from other lanes in the road map image.

* * * * *